TRAVELING WAVE PARAMETRIC AMPLIFIERS

Filed Dec. 27, 1960 3 Sheets-Sheet 1

INVENTOR
GEORGE F. BLAND

BY Stephen J. Limanek
ATTORNEY

June 11, 1963 G. F. BLAND 3,093,801

TRAVELING WAVE PARAMETRIC AMPLIFIERS

Filed Dec. 27, 1960 3 Sheets-Sheet 3

3,093,801

TRAVELING WAVE PARAMETRIC AMPLIFIERS

George F. Bland, New York, N.Y., assignor to International Business Machines Corporation, New York, N.Y., a corporation of New York Filed Dec. 27, 1960, Ser. No. 78,585
16 Claims. (Cl. 330—4.6)

This invention relates to parametric amplifiers and more particularly to improved traveling wave parametric amplifiers.

Parametric amplifiers have been used for the amplification of high frequency signals in at least the X-band of the microwave region. These parametric amplifiers include reactance elements which are periodically varied in value to provide the amplification. The reactance elements may be either in the form of capacitors or inductors which are variable in capacitance or inductance value, respectively, in accordance with the voltage applied to or current passing through them. Amplifiers of this type have been discussed in articles such as "A Traveling-Wave Ferromagnetic Amplifier" by Tien and Suhl in Proceedings of the IRE, April 1958, pages 700–706, "Non-Linear Capacitance Amplifiers" by L. S. Nergaard in RCA Review, March 1959, pages 3–17, "Parametric Energy Conversion in Distributed Systems" by Roe and Boyd in Proceedings of the IRE, July 1959, pages 1213–1218, "The Variable-Capacitance Parametric Amplifier" by E. D. Reed, in IRE Transactions on Electron Devices, volume ED–6, April 1959, No. 2, pages 216–224 and U.S. Patent No. 2,815,488 granted to J. Von Neumann on December 3, 1957.

As is well known the excitation energy, commonly called the pump energy, which is applied to a reactance element for varying the reactance value thereof, has a frequency generally substantially greater than the frequency of the signal which is to be amplified. The frequency of the pump energy is equal the sum of the frequency of the signal voltage plus the frequency of an idler voltage which is produced in the amplifier. When the signal and idler frequencies are of the same value the amplifier is generally referred to as a degenerative parametric amplifier. Higher frequencies formed as combinations of the pump and signal frequencies produced within the amplifier are suppressed or eliminated to obtain optimum amplification of the desired signal. When such amplifiers are provided in the form of a transmission line or traveling wave amplifier the suppression of the undesired combination may be accomplished by designing the line so that the velocity of propagation of the higher frequencies is different from the velocity of propagation of the pump frequency.

For efficient operation, it is important that a large fraction of the signal voltage and of the pump voltage appear across the variable reactance element without the signal voltage being introduced into the pump line and without the pump voltage entering into the signal line. When these parametric amplifiers take the form of transmission line or traveling wave parametric amplifiers, the above conditions for providing efficient operation has been difficult to obtain.

Accordingly, it is an object of this invention to provide an improved parametric amplifier wherein the signal and pump transmission line voltages are isolated from each other at all points except at a variable reactance element.

It is another object of this invention to provide an improved traveling wave parametric amplifier wherein the signal and pump transmission line voltages are isolated from each other at all points except at line intercoupling variable reactance elements.

It is still another object of this invention to provide an improved traveling wave parametric amplifier which is readily adaptable to symmetrical slab or strip transmission lines.

It is yet another object of this invention to provide an improved traveling wave parametric amplifier wherein the reactive elements intercoupling separate signal and pump transmission lines may be biased by an external source.

A further object of this invention is to provide an improved traveling wave parametric amplifier which amplifies a signal in a given direction along a transmission line without producing overall amplification of a wave or signal traveling in the opposite direction.

In accordance with the present invention, a parametric amplifier is provided wherein a variable reactance element intercouples signal and pump lines between a given point on each of the lines, the circuit being arranged so that the given point on the pump line appears as a short circuit to the signal voltage and the given point on the signal line appears as a short circuit to the pump voltage.

An advantage of the amplifier of the present invention is that means need not be provided in the amplifier or at the output thereof for separating the pump voltage from the signal voltage since the two voltages are never combined in either of the two lines. Another advantage of the amplifier of the present invention is that efficient operation is provided since a large fraction of the voltage on each of the lines appears across the reactance elements.

The foregoing and other objects, features and advantages of the invention will be apparent from the following more particular description of preferred embodiments of the invention, as illustrated in the accompanying drawings.

Figure 4:
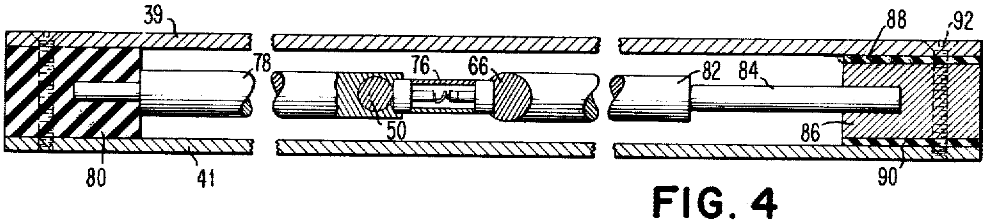
Figure 5:
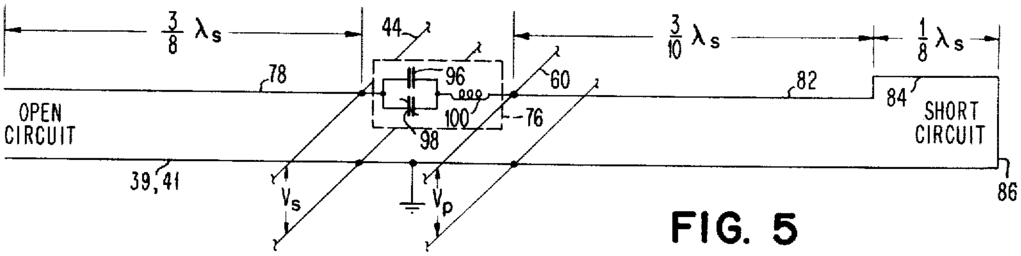
Figure 6:
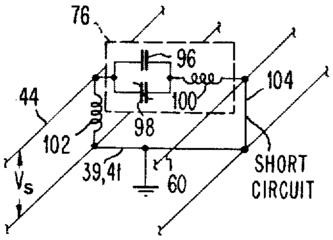
Figure 7:
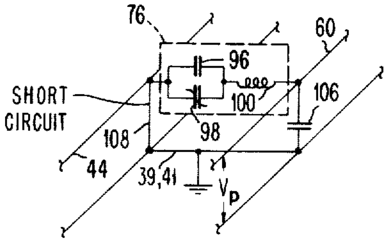
Figure 3:
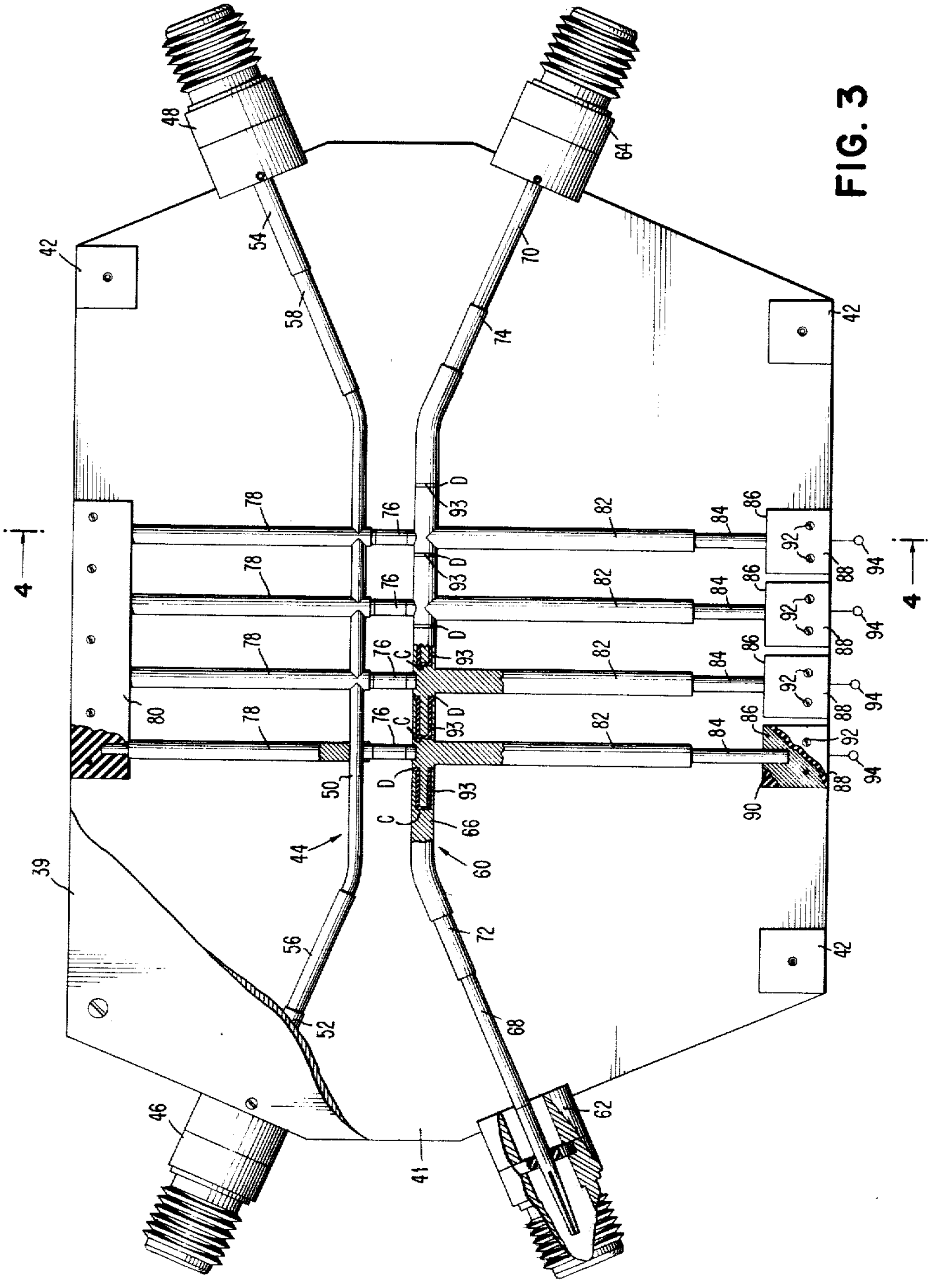
FIG. 3 shows a plan view, partially broken away, of an embodiment of the invention utilizing non-linear capacitance diodes.

FIG. 4 is a cross-sectional view of the amplifier shown in FIG. 3 taken through 4—4 of FIG. 3, FIG. 5 is an equivalent transmission line circuit diagram of the amplifier shown in FIG. 3, FIG. 6 is an equivalent transmission line circuit diagram of the amplifier illustrated in FIG. 3 as seen by the signal voltage $V_s$, and FIG. 7 is an equivalent transmission line circuit diagram of the amplifier shown in FIG. 3 as seen by the pump signal $V_p$.

Figure 1:
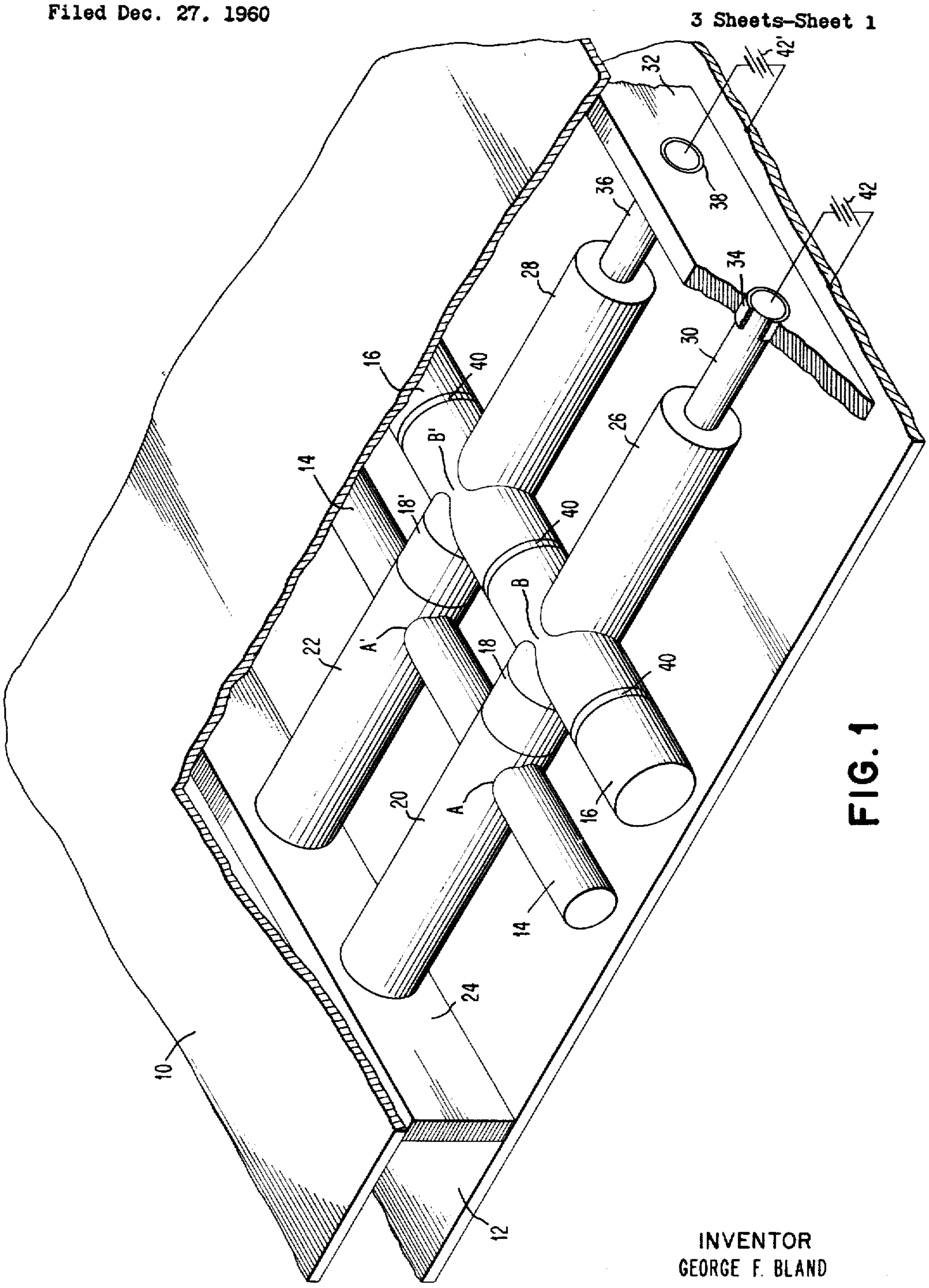
FIG. 1 is a perspective view, partially broken away, of the amplifier of the present invention.

Referring to the drawings in more detail, FIG. 1 shows the amplifier of this invention having an upper and a lower ground plate 10 and 12 which are electrically neutral with respect to each other, a signal line 14 having a characteristic impedance $Z_s$ and a pump line 16 having a characteristic impedance $Z_p$ disposed in parallel relationship with the signal line 14. The signal line 14 and the pump line 16 are located between the upper and lower plates 10 and 12 and spaced at equal distances therefrom. First and second variable reactance elements 18 and 18' intercouple the signal and pump lines 14, 16. The first element 18 intercouples point A of the signal line 14 and point B of the pump line 16 and the second element 18' intercouples point A' of the signal line 14 and point B' of the pump line. The distance separating the signal line 14 and the pump line 16 is such that there is no appreciable interaction between the two lines. This distance as determined by the size of presently available variable reactances, such as diodes, satisfies the separation requirements. A first stub 20 is connected at one end to the signal line 14 at point A and a second stub 22 is connected at one end to the signal line 14 at point A'. The opposite end of each of the stubs 20 and 22 is connected to a first shorting wall 24. A third stub 26 is connected at one end to the pump line 16 at point B and a fourth stub 28 is connected at one end to the pump line 16 at point B'. A fifth stub 30 is connected at one end to the other end of the third stub 26 and its opposite end is connected to a second shorting wall 32 through a first cylindrical insulator element 34. A sixth stub 36 is connected at one end to the other end of the fourth stub 28 and its opposite end is connected to the second shorting wall 32 through a second cylindrical insulator element 38. The characteristic impedance of each of the first, second, third and fourth stubs 20, 22, 26 and 28 may be referred to as having a value $Z_0$ while the characteristic impedance of each of the fifth and sixth stubs 30 and 26 is $Z_1$, a value substantially larger than the value $Z_0$, and the length of each of the first, second, third and fourth stubs is effectively equal to ½ the wave length of the pump voltage, $\lambda_p/2$, and the length of each of the fifth and sixth stubs is effectively equal to ¼ of the wave length of the pump voltage, $\lambda_p/4$. The first and second shorting walls 24 and 32 extend from the upper surface of the lower ground plate 12 to the lower surface of the upper ground plate 10 and thus may be used as spacers between the upper and lower ground plates 10 and 12 and as support members for the signal and pump lines 14, 16 and the stubs 20, 22, 26, 28, 30 and 36. Additional supporting members, if needed, may be provided between the upper and lower ground plates 10, 12 to support elements of the amplifier midway therebetween. These additional supporting members should be made of a material and arranged so as not to disturb the signals in the amplifier.

A plurality of direct current isolating sections 40 are inserted in the pump line 16 to provide direct current isolation of the points B and B' in the pump line 16 with respect to each other and to the remainder of the pump line 16. A first direct current voltage source 42 providing a bias voltage for the first variable reactance element 18 is connected to the element 18 through the third and fifth stubs 26, 30 and a second direct current voltage source 42' providing a bias voltage for the second variable reactance element 18' is connected to the element 18' through the fourth and sixth stubs 28, 36. The direct current isolating sections 40 and the cylindrical insulator elements 34, 38 may be made of any suitable insulating material, such as polystyrene or mylar. The signal and pump lines 14 and 16, the stubs 20, 22, 26, 28, 30 and 36, the shorting walls 24 and 32 and the upper and lower ground plates 10 and 12 may be solid cylindrical conductors made of brass. The available reactance elements 18, 18' are preferably non-linear capacitors.

In a traveling wave parametric amplifier, the velocity of propagation of the voltage in the pump line 16 should be the same as that of the voltage in the signal line 14. If the signal and pump lines 14, 16 have the characteristic impedances $Z_s$ and $Z_p$, respectively, and characteristic admittances $Y_s$ and $Y_p$, respectively, and both lines 14, 16 are loaded, e.g., with capacitors whose electrical spacing in radians is $\beta_0 L$ at the signal frequency, where $B_0$ is the propagation constant of the unloaded signal or pump line and L is the physical spacing between the capacitors and if $$\frac{Z_p}{Z_s}=\frac{Y_s}{Y_p}=a \text{ and } \frac{B}{Y_s}=b$$

at the signal frequency, where B is the non-varying admittance of the capacitors at the signal frequency, then the condition for equal velocities of signal and pump voltages in their respective lines is $$\tan \beta_0 L=\frac{4(1-a)}{b}$$

The electrical distance between the variable reactance elements 18 and 18' along the signal line 14 is equal to $\lambda_s/8$, for reasons to be explained hereinbelow.

Figure 2:
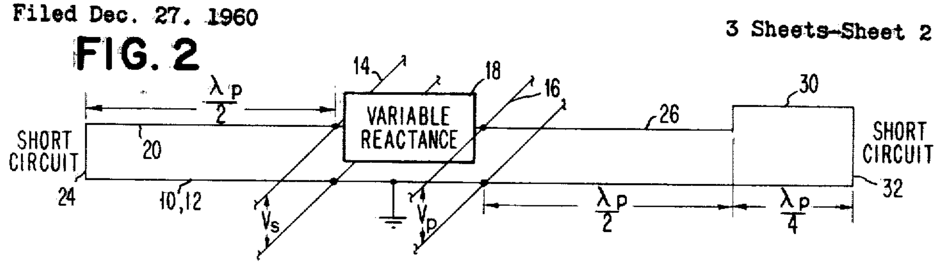
FIG. 2 is an equivalent transmission line circuit diagram of the amplifier shown in FIG. 1.

FIG. 2 shows the equivalent transmission line circuit diagram of one section or line segment of the amplifier illustrated in FIG. 1. The reference numerals used in FIG. 2 identify corresponding elements having like reference numerals in FIG. 1. FIG. 2 clearly shows that the lengths and characteristic impedances of the first and third stubs 20 and 26 are equal, that the fifth stub 30 has a length equal to ½ of the length of third stub 26 and a characteristic impedance larger than that of the third stub 26 and that the first and fifth stubs 20 and 30 are each terminated in a short circuit.

In the operation of the traveling wave parametric amplifier illustrated in FIG. 1, a signal voltage from a suitable source such as an X-13 klystron (not shown) having a frequency of, for example, 10 kmc., is applied to the signal line 14 so as to pass first through point A and then through point A'. A pump voltage produced by a suitable source, for example, a 2K33 klystron (not shown) having a frequency of, for example, 20 kmc., i.e., twice the frequency of the signal voltage, is applied to the pump line 16 so as to pass first through point B and then through point B'. As the pump voltage is applied to the variable reactance element 18, it varies the reactance of the element to thus vary the reactance across the signal line 14. These reactance variations will produce parametric amplification of the signal voltage in the signal line 14 in a well known manner. The pump voltage is applied from the pump line 16 directly to the variable reactance element 18 and it is effectively grounded at point A of the signal line 14 due to the short circuiting effect of the stub 20 which has an equivalent length of $\lambda_p/2$ terminated in a short circuit. Since the wave length of the signal voltage is twice the wave length of the pump voltage, the stub 20 will appear to the signal voltage at point A as an open circuit or high impedance. Thus, the pump voltage is grounded at point A of the signal line 14 and, therefore, cannot enter into the signal line 14 whereas the signal voltage may readily pass through point A of the signal line 14 to point A' thereof. The third stub 26, having a length $\lambda_p/2$, if terminated in an open circuit would appear at point B of pump line 16 to the pump voltage as a high impedance and to the signal voltage as a short circuit. However, in order to provide a direct current path through the variable reactance element 18 the third stub 26 is connected to the second shorting wall 32 through the fifth stub 30. The stubs 26 and 30 have a combined equivalent length of $\frac{3}{4}\lambda_p$ terminated in a short circuit, and, therefore, appear as an open circuit at point B of the pump line 16 to the pump voltage.

Since the third stub 26 has an equivalent length of $\lambda_s/4$ and a characteristic impedance $Z_0$ and the fifth stub 30 has an equivalent length of $\lambda_s/8$ and a characteristic impedance $Z_1$ such that $Z_1 \gg Z_0$, each series combination of stub 26 and stub 30 will produce an impedance at point B in pump line 16 at the signal frequency equal to $Z_0^2/Z_1$. The impedance $Z_1$ is made sufficiently large so that the apparent impedance $Z_0^2/Z_1$ in series with the reactance element 18 is much smaller than the impedance of the reactance element 18, thus causing a large fraction of the signal voltage to appear across the reactance element 18. Accordingly, with respect to the pump voltage the variable resistance element is essentially between the pump line 16 and a point of ground potential and with respect to the signal voltage the variable reactance is essentially between the signal line 14 and a point of ground potential.

The direct current voltage source 42 applies a bias voltage to the variable reactance element 18 through stubs 26 and 30 so as to produce in the element 18 a desired initial reactance value. Since the first cylindrical insulator element 34 is provided between the stub 30 and the second shorting wall 32 and isolating sections 40 are provided in the pump line 16 at each side of point B in the pump line 16, the bias voltage is applied to one terminal of the reactance element 18 and the other terminal of the reactance element is grounded at the first shorting wall 24. It should be understood that the first cylindrical insulator element 34 and each of the isolating sections 40 should be designed so as to provide sufficiently high capacitances at each of their locations to thus present a very low impedance to the microwave energy and yet appear as a very high impedance to the direct current energy.

It also should be understood that, if desired, the stub 26 may be open circuited, a cylindrical insulator element may be provided between the first stub 20 and the first shorting wall 24 and direct current isolating sections may be disposed in the signal line 14 on each side of point A instead of in the pump line 16. In this arrangement the direct current voltage source is coupled to the first stub 20 to apply a bias voltage to one terminal of the variable reactance element 18 and the other terminal of this element 18 may be connected to a point of ground potential at the pump line 16, e.g., by utilizing a single or double stub tuner in the pump line 16.

After the signal voltage is amplified at point A in the signal line 14 it is transmitted through line 14 to point A' where in a similar manner as described hereinabove it is again amplified, the line segment including the second, fourth and sixth stubs and the reactance element 18' being similar to corresponding elements of the line segment including the first, third and fifth stubs and the reactance element 18. Although a component of the amplified voltage at point A is transmitted along the signal line 14 to point A', another component of this amplified voltage travels in the opposite direction along the signal line 14. Thus, when the signal voltage is amplified at point A' a component of this voltage travels back to point A in the signal line 14. Since it is desirable to provide a directional amplifier, the component of the amplified voltage at point A' returning to point A should not now be amplified at point A. As mentioned hereinabove, the spacing of the variable elements 18 and 18' along the signal line 14 is equal to $\lambda_s/8$. This spacing is provided so that the signal energy traveling in the forward or desired direction is amplified without effectively amplifying the signal traveling through the signal line in the reverse or backward directing. To better understand the reason for providing the $\lambda_s/8$ spacing between the reactance elements 18 and 18', consider the pump voltage traveling along the pump line 16 in a forward direction from point B to point B' which are spaced apart by a distance equivalent to $\lambda_s/8$, and the signal voltage traveling along the signal line 14 in the reverse or backward direction from point A' to point A, then the phase of the pump voltage relative to the signal voltage at the first reactance element 18 is 90° different from the relationship existing at the second reactance element 18'. Thus, if the phase relation of the two voltages is adjusted so that the maximum amplification takes place at the second reactance element 18', the backward flowing component of the signal energy will be attenuated at the first reactance element 18, as described in more detail in the above-mentioned Reed article. Therefore, the effect of one reactance element is offset by the next reactance element when the signal energy is traveling in the reverse or backward direction. If an even number of reactance elements are provided in the amplifier, it can be seen that the reverse gain of the signal energy is only of the order of unity. Thus, it can be readily seen that a directional traveling wave parametric amplifier has been provided wherein the pump and signal voltage are not intermixed in either the pump line or the signal line but only in the variable reactance element intercoupling the lines.

FIG. 3 shows a top view, partly broken away, of a traveling wave parametric amplifier of the present invention for amplifying signal voltages having a frequency of 3 kmc., which utilizes non-linear capacitance diodes or varactors for the variable reactance elements. This amplifier is provided with an upper ground plate 39 and a lower ground plate 41, which are electrically neutral with respect to each other, held in spaced apart relationship by a plurality of spacers 42. A signal line 44 disposed between the upper and lower ground plates 39 and 41 is connected at one end to a first coaxial cable connector 46 and at the other end to a second coaxial cable connecter 48. The signal line 44 may be physically supported between the two ground plates 39 and 41 at points intermediate the coaxial connectors 46, 48 by suitable insulating spacers (not shown) provided at one or more points along the signal line 44 so as to support the signal line 44 midway between the upper and lower ground plates 39 and 41. The signal line 44 includes a 70 ohm section 50, first and second 50 ohm sections 52 and 54, respectively, which may be coupled to 50 ohm transmission lines by the coaxial connectors 46, 48, and first and second quarter wave matching transformers 56, 58 at the signal frequency for matching the 70 ohm section 50 to the 50 ohm sections 52, 54. A pump line 60 disposed between the upper and lower ground plates 39, 41 is connected at one end to a third coaxial cable connector 62 and at the other end to a fourth coaxial cable connecter 64. The pump line 60 may also be physically supported between the two ground plates 39, 41 by suitable insulating spacers (not shown) provided at one or more points along the pump line 60 so as to support the line 60 midway between the upper and lower ground plates 39 and 41. The pump line 60 includes a 30 ohm section 66, third and fourth 50 ohm sections 68 and 70, respectively, and first and second quarter wave matching transformers 72, 74 at the pump frequency for matching the 30 ohm section to the 50 ohm section. A plurality of non-linear capacitance semiconductor diodes or varactors 76, for example, MA4253X diodes, interconnect section 50 of signal line 44 and section 66 of pump line 60 at equally spaced points along the section 50 and corresponding points along section 66 separated along each of the lines by a distance $\lambda_s/8$ between the center lines of adjacent diodes 76. A plurality of first stubs 78 each having an equivalent length $\frac{3}{8}\lambda_s$ are connected at one end to the section 50 of the signal line 44 at spaced intervals opposite the points at which the diodes 76 are connected. The opposite end of each of the plurality of first stubs 78 is connected to an insulator block 80 which is used to support the plurality of first stubs 78 at positions midway between the upper and lower ground plates 39 and 41. The insulator block 80 may be made of any suitable insulating material, such as Teflon.

A plurality of second stubs 82, each having a length equivalent to approximately $\frac{3}{10}\lambda_s$ are connected at one end to the section 66 of the pump line 60 at spaced intervals opposite the points at which the diodes 76 are connected thereto. A different one of a plurality of third stubs 84, each having a length equivalent to $\lambda_s/8$, is connected at one end to the other end of each stub of the plurality of second stubs 82, the opposite end of each of the third stubs 84 is connected to a different one of a plurality of shorting blocks 86 disposed between the upper and lower ground plates 39 and 41.

Disposed between each of the shorting blocks 86 and the upper ground plate 39 is a first thin layer of insulating material 88 and between each of the shorting blocks 86 and the lower plate 41 is a second thin layer of insulating material 90. The layers of insulating material 88, 90 may be made of any suitable insulating material, for example, Mylar. The shorting blocks 86 are spaced from each other so as to provide an air gap between adjacent shorting blocks to form therebetween a direct current insulation medium. The layers of insulative material 88, 90 and the shorting blocks 86 are held in position between the ground plates 39, 41 by a plurality of screws 92 which are made of an insulating material, such as nylon. A plurality of direct current isolating sections 93 are disposed in the 30 ohm section 66 of the pump line 60 to provide direct current isolation of each point in the pump line 60 at which one of the diodes 76 is connected from the remainder of the pump line 60. Each of the isolating sections 93 is substantially an insulation cylinder having a length $\lambda_p/4$, preferably made of polystyrene, and point C in the line 60 at one end of the section 93 appears as an open circuit to the pump voltage so that the insulation gap or discontinuity at the surface D of the pump line 60 provides a zero impedance to the pump voltage. A plurality of direct current voltage terminals 94 for providing a separate bias voltage for each of the diodes 76 is connected to each of the shorting blocks 86. Each of the shorting blocks 86, the plurality of first, second and third stubs 78, 82 and 84, the signal line 44, the pump line 60 and the upper and lower ground plates 39 and 41 may be made of any suitable conducting material such as brass.

FIG. 4 illustrates a cross-sectional view of the amplifier shown in FIG. 3 taken through line 4—4. It can be seen in FIG. 4 that the first stubs 78, the diodes 76, the second stubs 82 and the third stubs 84 are supported at equal distances from the upper ground plate 39 and the lower ground plate 41 by the insulator block 80 at one side of the ground plates 39, 41 and by the shorting blocks 86 and the first and second insulating layers of material 88 and 90 at the other side of the ground plates 39, 41. The section 50 of the signal line 44 is shown passing through the first stub 78 and the diode 76 is shown in some detail in electrical contact at one end thereof with section 50 of the signal line 44 and at the other end thereof with section 66 of pump line 60.

FIG. 5 shows the equivalent transmission line circuit diagram of one section or line segment of the amplifier illustrated in FIG. 3 of the drawing. The reference numerals used in FIG. 5 identify corresponding elements having like reference numerals in FIGS. 3 and 4. FIG. 5 shows the signal line 44 and the pump line 60 separated by the diode 76, shown in its equivalent circuit form within the dashed lines. The equivalent circuit of each of the diodes 76 includes a fixed capacitor 96 connected in parallel with a variable capacitor 98 and this parallel combination connected serially with an inductor 100. The first stubs 78 and the second stubs 82 are shown in FIG. 5 to have substantially the same characteristic impedances and the third stubs 84 have a characteristic impedance which is somewhat greater than the characteristic impedances of the first and second stubs 78 and 82. FIG. 5 also indicates the length of each of the first stubs 78 to be $\frac{3}{8}\lambda_s$, the second stubs 82 to have a length $\frac{3}{10}\lambda_s$ and the third stubs 84 to have a length equal to $\lambda_s/8$. The first stubs 78 are clearly shown to be terminated in an open circuit and the third stubs 84 are shown short circuited.

FIG. 6 is an equivalent transmission line circuit diagram of one section of the amplifier illustrated in FIG. 3, patterned after the diagram of FIG. 5, as seen by the signal voltage $V_s$. In FIG. 6 an inductor 102 is shown replacing the open circuited first stub 78 and a short circuit 104 is shown replacing the short circuited combination of the stubs 82 and 84.

FIG. 7 is an equivalent transmission line circuit diagram of one section of the amplifier shown in FIG. 3, patterned after the diagram of FIG. 5, as seen by the pump voltage $V_p$. In FIG. 7 a capacitor 106 is shown replacing the short circuited combination of stubs 82 and 84 and a short circuit 108 is shown replacing the open circuited stub 78.

The operation of the amplifier illustrated in FIGS. 3 and 4 is similar to the operation of the amplifier illustrated in FIG. 1 of the drawing except that the fixed reactances of the diodes 76 seen by the signal and pump voltages has been taken into consideration. It has been found that the signal voltage at the points in the signal line 44 at which the diodes 76 are connected sees in the diodes a fixed capacitance as well as a variable capacitance, and that the pump voltage at the points in the pump line 60 at which the diodes 76 are connected sees substantially a fixed inductance caused by the leads of the diodes 76. In order to avoid the capacitance loading of the signal line 44 by the fixed capacitance of diode 76, the stub lines 78 have been adjusted to a length so as to appear to the signal voltage, at the points in the signal line 44 at which the diodes 76 are connected, as an inductance, indicated by inductor 102 in FIG. 6, while still appearing substantially as a short circuit to the pump voltage. The value of inductance provided by each of the stubs 78 is such as to provide a parallel resonant circuit with the fixed capacitance of one of the diodes 76. The section 50 of the signal line 44 was chosen to have a high value of impedance so that the fixed capacitance of the section 50 of the signal line 44 appears to the signal voltage as having a low value in order to provide high fractional changes of capacitance at the pump frequency. Thus, the signal voltage now sees substantially only the variable capacitance of the diode as controlled by the pump voltage. In order to avoid the inductance loading of the pump line 60 by the fixed inductance of the diode leads, the lengths of the second and third stubs 82 and 84 have been adjusted so as to appear to the pump voltage, at the points in the pump line 60 at which the diodes 76 are connected, as a capacitance, indicated by the capacitor 106 in FIG. 7, while still appearing substantially as a short circuit to the signal voltage. The value of capacitance provided by each pair of the interconnected stubs 82 and 84 is such as to provide a parallel resonant circuit with the fixed inductance of the leads of one of the diodes 76 to, thus, avoid inductively loading pump line 16.

Although the embodiments of the amplifier of this invention have been described and illustrated as being in the slab line form, i.e., the signal and pump lines and the stubs being made of solid cylindrical conductive material, it should be understood that the amplifier of the present invention may use any type of transmission line structure.

Accordingly, it can be seen that a traveling wave parametric amplifier has been provided wherein substantially the entire signal and pump voltages are applied across the variable reactance elements intercoupling the two lines without permitting the pump voltage to enter into the signal line nor the signal voltage to enter into the pump line.

While the invention has been particularly shown and described with reference to preferred embodiments thereof, it will be understood by those skilled in the art that various changes in form and details may be made therein without departing from the spirit and scope of the invention.

What is claimed is:

1. An amplifier comprising first and second transmission lines, means for applying a signal voltage having a first frequency to said first line, means for applying to said second line a pump voltage having a second frequency higher than said second frequency, a variable reactance inter-coupling said lines between a given point on each of said lines, first impedance means coupled to the given point of said first line having at the given point of said first line a substantially infinite impedance value for said signal voltage and a substantially zero impedance value for said pump voltage and second impedance means coupled to the given point of said second line having at the given point of said second line a substantially infinite impedance value for said pump voltage and a substantially zero impedance value for said signal voltage.

2. An amplifier as set forth in claim 1 further including means for applying a direct current voltage to said reactance for altering the reactance value thereof.

3. An amplifier comprising first and second transmission lines, means for applying a first voltage having a first frequency to said first line, means for applying a second voltage having a second frequency to said second line, a variable reactance having a given impedance value intercoupling said lines between a given point on each of said lines, first impedance means coupled to the given point of said first line having at said given point of said first line a substantially higher impedance value for said first voltage and a substantially lower impedance value for said second voltage compared to said given impedance value of said variable reactance and second impedance means coupled to the given point of said second line having at the given point of said second line a substantially higher impedance value for said second voltage and a substantially lower impedance value for said first voltage compared to said given impedance value of said variable reactance.

4. An amplifier comprising first and second transmission lines, means for applying a signal voltage having a first frequency to said first line, means for applying to said second line a pump voltage having a second frequency higher than said first frequency, a variable reactance intercoupling said lines at a given point on each of said lines, first impedance means coupled to the given point of said first line having at the given point of said first line a substantially infinite impedance value for said signal voltage and a substantially zero impedance value for said pump voltage, a second impedance means coupled to the given point of said second line having at the given point of said first line a substantially infinite impedance value for said pump voltage and a substantially zero impedance value for said signal voltage and means for applying a direct current voltage to said reactance for altering the reactance value thereof through one of said impedance means and one of said transmission lines, said one transmission line being provided with direct current insulating means on each side of the given point of said one transmission line.

5. An amplifier as set forth in claim 4 wherein said variable reactance is a variable capacitance.

6. An amplifier comprising first and second transmission lines, means for applying a signal voltage having a first frequency to said first line, means for applying to said second line a pump voltage having a second frequency higher than said first frequency, a non-linear capacitance diode intercoupling said lines at a given point on each of said lines, first impedance means coupled to the given point of said first line having at the given point of said first line a substantially infinite impedance value for said signal voltage and a substantially zero impedance value for said pump voltage, second impedance means coupled to the given point of said second line having at the given point of said second line a substantially infinite impedance value for said pump voltage and a substantially zero impedance value for said signal voltage, and means for applying a direct current voltage to said diode for varying the capacitance thereof through one of said impedance means and one of said transmission lines, said one transmission line being provided with direct current insulating means on each side of the given point in said one transmission line.

7. An amplifier comprising a pair of spaced apart ground plates, first and second electrically conductive lines spaced apart from each other and disposed between said first and second plates midway therebetween, means for applying a signal voltage having a first frequency to said first line, means for applying a pump voltage having a second frequency equal to twice the frequency of said first voltage to said second line, a non-linear capacitance diode intercoupling said first and second lines at a given point on each of said lines, a first conductive wall disposed between and electrically interconnecting said first and second ground plates, a first conductive stub having a length equivalent to ½ the wave length of the pump voltage connected between the given point on said first line and said first conductive wall, a second conductive wall disposed between and interconnecting said first and second ground plates, a second conductive stub having a length which is the equivalent of ½ the wave length of the pump voltage connected at one end to the given point on said second line, a third conductive stub having a length which is the equivalent of ¼ the wave length of the pump voltage connected at one end to the opposite end of said second stub, the other end of said third stub being connected to said second conductive wall, means for providing direct current isolation between said third stub and said second wall while permitting high frequencies of electrical energy to pass therebetween, said second line having means disposed therein on each side of said given point for preventing the passage through said second line of direct current energy while permitting the flow of the pump voltage and means for applying to said third stub a direct current bias voltage for said diode.

8. An amplifier comprising a pair of spaced apart ground plates, first and second electrically conductive lines spaced apart from each other and disposed between said first and second plates midway therebetween, means for applying a signal voltage having a first frequency to said first line, means for applying a pump voltage having a second frequency equal to twice the frequency of said first voltage to said second line, a non-linear capacitance diode intercoupling said first and second lines at a given point on each of said lines, a first conductive wall disposed between and electrically interconnecting said first and second ground plates, a first conductive stub having a length equivalent to ½ the wave length of the pump voltage connected between the given point on said first line and said first conductive wall and a second conductive stub having a length which is the equivalent of ½ the wave length of the pump voltage connected at one end to the given point on said second line and extending outwardly therefrom so as to be positioned midway between said first and second ground plates.

9. An amplifier as set forth in claim 8 wherein said first and second conductive lines are spaced apart by a distance at which there is no appreciable interaction between the two lines.

10. An amplifier as set forth in claim 9 wherein said first conductive line and said first and second ground plates form a first transmission line having a given characteristic impedance and the second conductive line and the first and second ground plates form a second transmission line having a characteristic impedance substantially lower than the characteristic impedance of said first transmission line.

11. An amplifier as set forth in claim 8 wherein said first and second conductive lines and said first and second stubs are made of conductive rods.

12. A traveling wave amplifier comprising first and second transmission lines, means for applying a signal voltage having a first frequency to said first line, means for applying a pump voltage having a second frequency equal to twice the frequency of the signal voltage to said second line, a first variable reactance intercoupling said lines at a first given point on each of said lines, first impedance means coupled to the given point of said first line having at the given point of said first line a substantially infinite impedance value for said signal voltage and a substantially zero impedance value for said pump voltage, and second impedance means coupled to the given point of said second line having at the given point of said second line a substantially infinite impedance value for said pump voltage and a substantially zero impedance value for said signal voltage, a second variable reactance interconnecting said first and second lines at a second given point on each of said lines, the distance between said first and second points on each of said lines being equal to ⅛ of the wave length of the signal voltage, third impedance means coupled to the second point of said first line having at the second given point of said first line a substantially infinite impedance value for said signal voltage and a substantially zero impedance value for said pump voltage and fourth impedance means coupled to the second given point of said second line having at the second given point of said second given line a substantially infinite impedance value for said pump voltage and a substantially zero impedance value for said signal voltage.

13. A traveling wave parametric amplifier comprising first and second transmission lines, means for applying a signal voltage having a first frequency to said first line, means for applying to said second line a pump voltage having a second frequency higher than said first frequency, a first variable reactance having a given impedance value intercoupling said first and second lines at a first given point on each of said lines, first impedance means coupled to the given point of said first line having at the given point of said first line a substantially infinite impedance value for said signal voltage and a substantially zero impedance value for said pump voltage and second impedance means coupled to the given point of said second line having at the given point of said second line a substantially higher impedance value for said pump voltage and a substantially lower impedance value for said signal voltage compared to the given impedance value of said variable reactance, first means for applying a direct current bias voltage to said first variable reactance, a second variable reactance having a given impedance value intercoupling said first and second lines at a second given point on each of said lines, said first and second given points being spaced apart on each of said lines by a distance equal to an odd multiple of ⅛ wave length of the signal voltage, third impedance means coupled to the second given point of said first line having at the second given point of said first line a substantially infinite impedance value for said signal voltage and a substantially zero impedance value for said pump voltage, fourth impedance means coupled to said second given point of said second given line having at the second given point of said second given line a substantially higher impedance value for said pump voltage and a substantially lower impedance value for said signal voltage compared to the given impedance value of said second variable reactance and second means for applying a direct current bias voltage to said second variable reactance.

14. A traveling wave parametric amplifier comprising a transmission line, means for applying a signal voltage having a first frequency to said transmission line, first and second variable reactances coupled to said transmission line at spaced apart points, the distance between said spaced apart points being equal to ⅛ of the wave length of the signal voltage, means for applying a pump voltage having a second frequency equal to twice the frequency of said signal voltage to each of said first and second variable reactances, first and second impedance means each coupled to a different one of said first and second points of said transmission line having at its associated point of said transmission line a substantially infinite impedance value for said signal voltage and a substantially zero impedance value for said pump voltage and third and fourth impedance means each coupled to a different one of said first and second variable reactances at the point at which said pump voltage is applied to said variable reactances having at said point on said variable reactances a substantially infinite impedance value for said pump voltage and a substantially zero impedance value for said signal voltage.

15. A traveling wave parametric amplifier comprising a transmission line, means for applying a signal voltage having a first frequency to said transmission line, first and second non-linear variable capacitance diodes coupled to said transmission line at spaced apart points, the distance between said spaced apart points being equal to ⅛ of the wave length of the signal voltage, means for applying a pump voltage having a second frequency equal to twice the frequency of said signal voltage to each of said first and second non-linear variable capacitance diodes, first and second impedance means each coupled to a different one of said first and second points of said transmission line having at its associated point of said transmission line a high impedance value for said signal voltage and a substantially zero impedance value for said pump voltage and third and fourth impedance means each coupled to a different one of said first and second non-linear variable capacitance diodes at the point at which said pump voltage is applied to said non-linear variable capacitance diodes having at said point on said non-linear variable capacitance diodes a high impedance value for said pump voltage and a substantially zero impedance value for said signal voltage.

16. A traveling wave parametric amplifier as set forth in claim 15 further including means for applying a direct current bias voltage to each of said non-linear variable capacitance diodes.

References Cited in the file of this patent

UNITED STATES PATENTS 3,012,203 Tien ---------------------- Dec. 5, 1961

OTHER REFERENCES

Currie et al.: "Proceedings of the IRE," December 1960, pages 1960–1973.

Grabowski et al.: "Proceedings of the IRE," December 1960, pages 1973–1987.

UNITED STATES PATENT OFFICE

CERTIFICATE OF CORRECTION

Patent No. 3,093,801 June 11, 1963

George F. Bland

It is hereby certified that error appears in the above numbered patent requiring correction and that the said Letters Patent should read as corrected below.

Column 4, line 64, for "resistance" read -- reactance --; column 5, line 46, for "directing" read -- direction --.

Signed and sealed this 7th day of April 1964.

(SEAL)
Attest:

ERNEST W. SWIDER
Attesting Officer

EDWARD J. BRENNER
Commissioner of Patents